Jan. 6, 1931. B. V. BENSCH 1,788,272
WEEDER
Filed Nov. 22, 1929 3 Sheets-Sheet 1
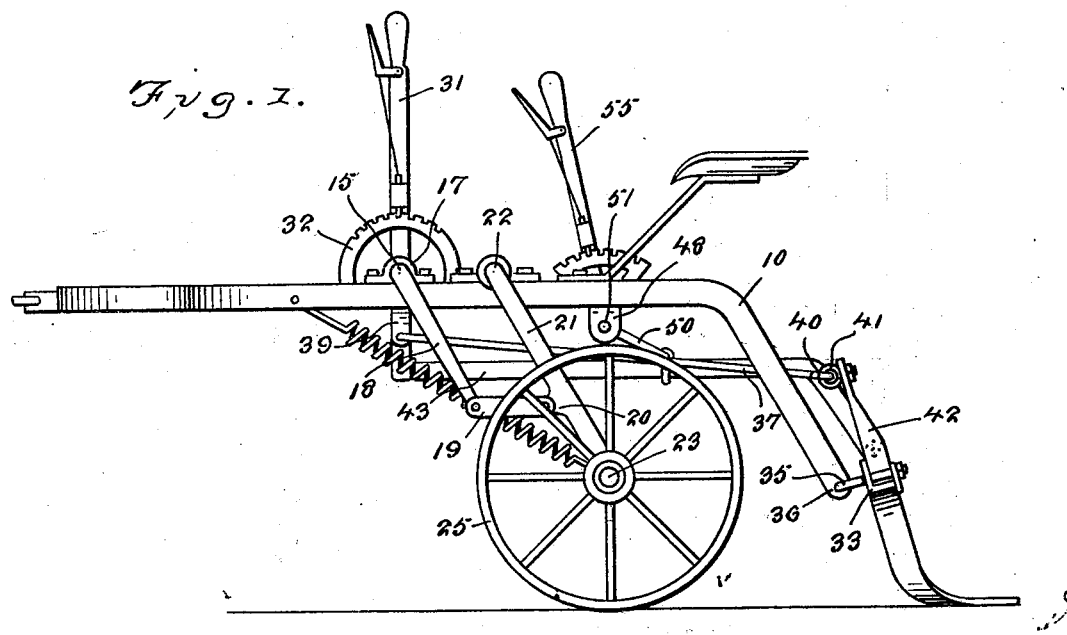
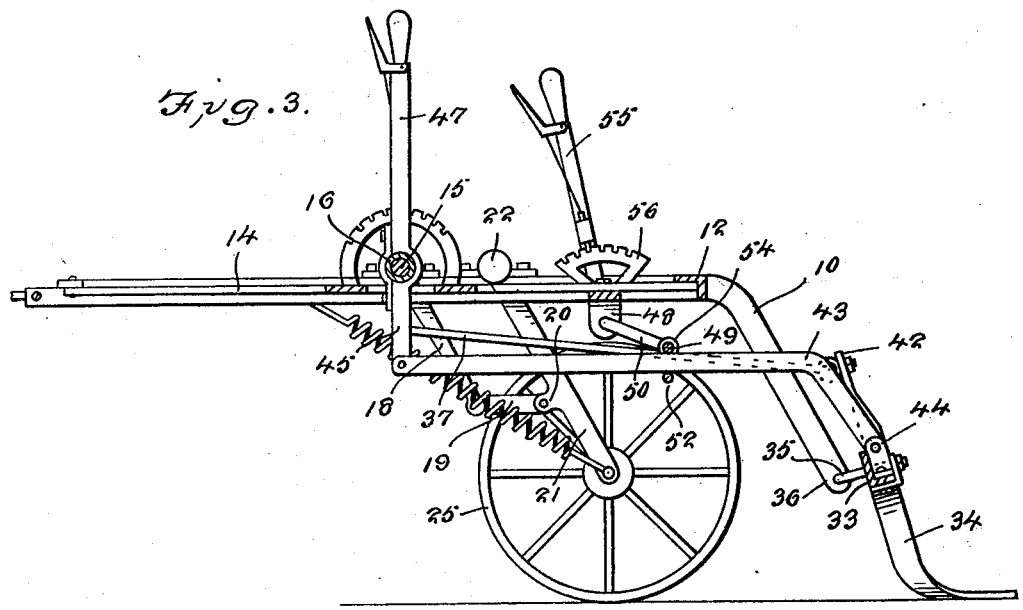
B. V. Benson
INVENTOR
BY Victor J. Evans
ATTORNEY

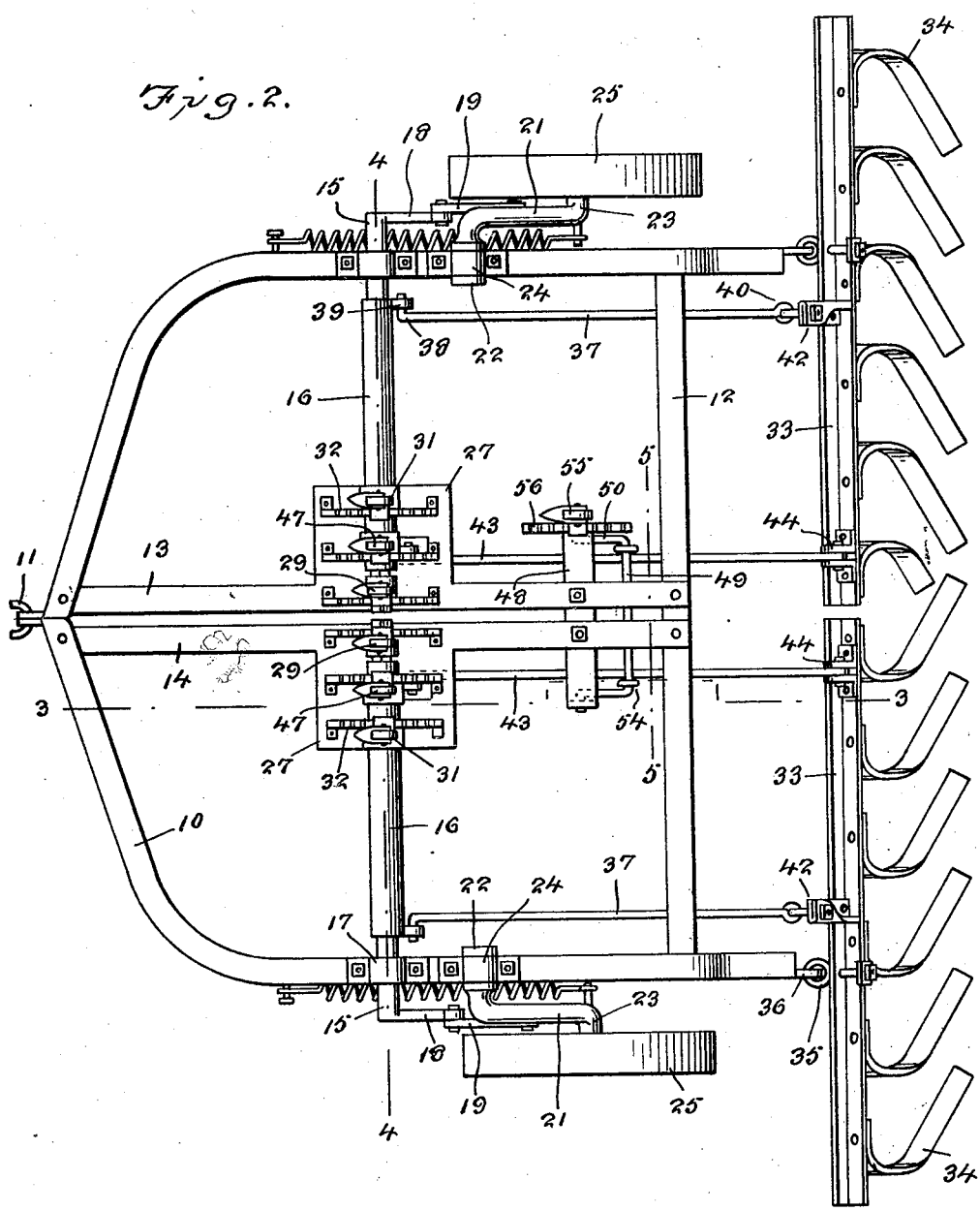

Jan. 6, 1931.  B. V. BENSCH  1,788,272
WEEDER
Filed Nov. 22, 1929  3 Sheets-Sheet 3
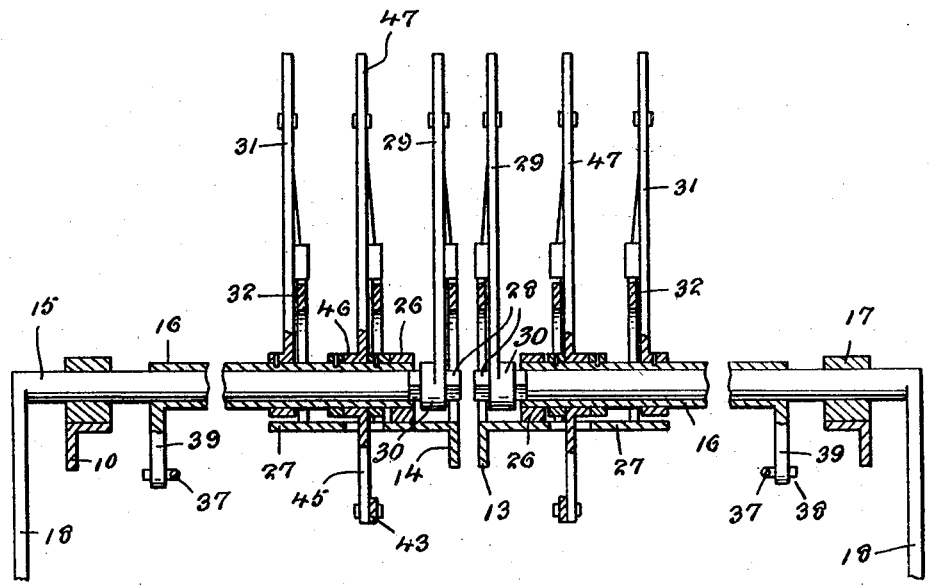
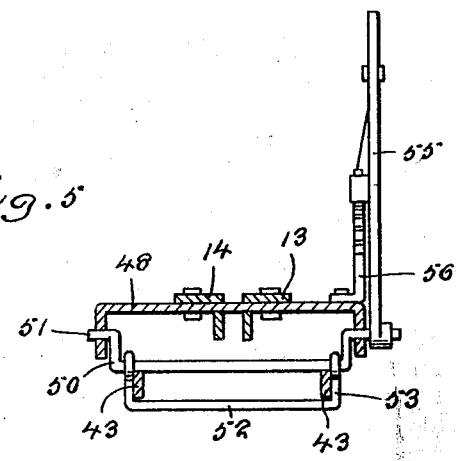
B. V. Bensch
INVENTOR
BY Victor J. Evans
ATTORNEY Patented Jan. 6, 1931

1,788,272

UNITED STATES PATENT OFFICE

BENJAMIN V. BENSCH, OF BONIN, MONTANA

WEEDER

Application filed November 22, 1929. Serial No. 409,106.

This invention relates to certain new and useful improvements in agricultural machinery and implements therefor and especially to that form of implement employed for the cutting or close cropping of weeds.

An object of the invention consists of wheel regulating and control members whereby the sides or the entire implement may be raised and lowered at will pursuant to the configuration of the field.

Another object of the invention comprises operating members for controlling the angle and depth cut of the implements.

An additional object of the invention contemplates the provision and arrangement of an operating lever having operative engagement with the implement carrying structure to tilt same in different directions in the event it is desirous to cut out dead furrows and the like.

More specifically stated the implements upon the adjusted portion of the machine are oppositely disposed and inwardly inclined whereby draw cutting action will be exercised against the stalks and blades of weeds and the like to facilitate an effective cutting action thereagainst.

With the above and other objects in view, the invention further consists of the following novel features and details of construction, to be hereinafter more fully decribed, illustrated in the accompanying drawings and pointed out in the appended claims.

In the drawings:—

Figure 1 is a side elevation of the present invention.

Figure 2 is a top plan view thereof.

Figure 3 is a sectional view taken on line 3—3 of Figure 2.

Figure 4 is a horizontal sectional view taken on line 4—4 of Figure 2.

Figure 5 is a detail sectional view taken on line 5—5 of Figure 2.

Referring to the drawings in detail wherein like characters of reference denote corresponding parts, the reference character 10 indicates the frame of the present form of agricultural implement or machine chassis having a tractor, single tree, whiffle or double tree attaching clevis 11 upon the forward portion and centrally thereof whereby central longitudinal draft action may be exercised upon the implement or machine to obviate side draft. A cross beam 12 having connection terminally thereof with the adjacent portions of the parallel sides of the chassis will relieve weaving action and preserve stability of the machine or implement as a whole. Spaced longitudinal brace members 13 and 14 respectively having connection upon opposite sides of the attaching clevis yoke connection in the manner suggested in Figure 2 of the drawings are extended rearwardly for an appreciable distance of the length of the machine or implement and secured to the upper side of the cross brace 12.

Bar members 15 telescopically associated within the bores of pipe sections 16 for oscillatory rocking motion therein are also journaled upon the upper sides of the chassis 10 within bearing members 17. Crank arms 18 carried by, offset and depending from the bar members 15 are connected with the adjacent ends of pivoted links 19. The remaining extremities of said links are likewise connected with ears 20 upon wheels carrying arms 21 having stub axles or spindle portions 22 and 23 oppositely disposed upon the ends thereof.

The spindle portions 22 upon the uppermost ends of the wheel carrying arms 21 are rockingly mounted within bearing members 24 also included upon the upper portion of the chassis provide the orbits for said arms. The spindle bodies or portions 23 carried by and outwardly projecting from the lowermost ends of the wheel carrying arms 21 support or otherwise journal the ground engaging wheels 25. The innermost projecting spaced ends of the pipe sections 16 are mounted within boxings or journals 26 carried upon the upper surfaces of supporting plates 27 laterally projecting from the horizontal fins of the spaced longitudinally disposed angle bars or braces 13 and 14 respectively. The innermost extremities of the bar members 15, however, extend inwardly for appreciable distances beyond and without the bores of the pipe sections 16 and which are terminally shaped to provide squared portions 28. Lever members 29 having journal boxes 30 formed upon the lowermost ends thereof and moulded, machined or otherwise provided with rectangular openings therein to accommodate the squared ends 28 of the bar members 15 therein are designed to provide the means for imparting the necessary oscillatory movement to the crank arms 18 whereby the ground engaging wheels 25 may be elevated and lowered to alter the position of the machine or implement.

Lever members 31 fixed upon the pipe sections 16 for simultaneous rocking motion therewith have the dogs therefor traveling over the toothed faces of the segments 32 therefor, secured to the supporting plates 27, for selective engagement therebetween in order that the implement supporting members, to be described in the following, may be adjusted in accordance with the growth of the weeds to be cut.

The implement or cutter carrying members alluded to in the foregoing and as indicated at 33 may be of angular construction to support a conventional form of cutter 34 upon one of the surfaces therefor. Successions of these forms of cutters are oppositely disposed upon each of the implement or cutter carrying members as understood from the illustration of my invention in Figure 2 of the drawings. Eye bolts 35, horizontally disposed and eccentrically located upon the cutter or implement carrying members 33, are passed through ears 36 in the adjacent extremities of the chassis 10 for universal movement therefrom. Connecting rods, such as indicated at 37, having offset portions 38 upon their foremost ends passed through the ends of apertured lugs 39 depending upon the under sides and adjacent the outermost ends of the pipe sections 16, are formed with eyes 40 upon their rearmost ends for universal connection with eye bolts 41 horizontally and centrally disposed of the lengths of the cutter or implement carrying members 33.

Arms 42 are employed as the means of connection between the cutter or implement carrying members 33 and the eye bolts 41 whereby considerable leverage may be exercised from the initial universal connections aforementioned to facilitate the altering of the depth cut of the implements.

Connecting links of the configuration shown as at 43 downwardly and obliquely offset adjacent their rearmost ends after the manner of the adjacent extremities of the chassis 10, are pivoted between spaced L-shaped ears 44 arranged adjacent the innermost ends of the cutter or implement carrying members 33. Arm members 45 carried as extensions of and depending from the sleeve bearings 46 of handle levers 47 journaled upon those portions of the pipe sections 16 between the handle levers 29 and 31 respectively to facilitate the drawing or extending of the innermost ends of the implement or cutter carrying members.

Aside from the various adjustments afforded in the present form of agricultural implement, both for the raising and lowering of the chassis with respect to the wheels and the implements with respect to the chassis, it is also my intention to provide a means of adjustment whereby the innermost ends of the cutter or implement carrying members 33 may be tilted either upwardly or downwardly. In the latter case dead furrows could be cut out whereas the elevating of the innermost ends of the members 33 may be for the purpose of avoiding stumps, stones and other objects which may injure the cutters or implements.

This additional adjustment is effected through the employment of a substantially inverted U-shaped plate member 48 having connection at intervals upon the under sides of the longitudinal brace members 13 and 14 respectively. A rock shaft 49 having upstanding parallel ends 50 terminate to provide outwardly and oppositely horizontally disposed pintles or trunnions 51 journaled within the adjacent depending portions of the U-shaped plate member 48 in the manner suggested in Figure 5 of the drawings. A yoke member 52 also having upstanding ends, indicated as at 53, form eyes 54 upon the extremities thereof passed around the rock shaft 49. The connecting link 43, operable by and from the handle levers 47, are passed through the enclosure of the yoke member 52 and engageable with the horizontally disposed portion of the rockshaft 49. An operating lever 55 fixed upon one of the trunnions or pintles 51 projecting from the rock shaft 49 works across the face of a segment 56 whereby the connecting links 43 will be raised and lowered in the manner outlined in the foregoing.

The invention is susceptible of various changes in its form, proportions and minor details of construction, and the right is herein reserved to make such changes as properly fall within the scope of the appended claims.

Having described the invention, what is claimed is:—

1. An agricultural implement comprising a chassis having downwardly and obliquely inclined rearmost ends, implement carrying members eccentrically mounted for universal movement upon the downwardly and obliquely inclined rearmost ends of the chassis, an operating lever carried upon the chassis having connection with the implement supporting members to rock the latter, and lever members having connection with the innermost ends of the implement carrying members to angularly dispose the implement carrying members from the universal connections therefor.

2. An agricultural implement comprising a chassis having downwardly and obliquely inclined rearmost ends, implement carrying members disposed in spaced rectilinear alignment and eccentrically mounted for universal movement upon the downwardly and obliquely inclined rearmost ends of the chassis, lever members having separate linkage connections with the innermost ends of the implement carrying members to angularly dispose the implement carrying members from the universal connections therefor, and an operating lever mounted upon the chassis cooperatively associated with both linkage connections to simultaneously rock the implement carrying members in a single operation.

3. An agricultural implement comprising a chassis having implement carrying members disposed in spaced alignment and eccentrically mounted for universal movement thereon, lever members mounted upon the chassis having linkage connections with the innermost spaced ends of the implement carrying members, an operating lever, and connecting means for the operating lever having biting engagement with the linkage connections for simultaneously rocking the implement carrying members.

4. An agricultural implement comprising a chassis having implement carrying members disposed in spaced alignment and eccentrically mounted for universal movement thereon, lever members having linkage connections with the innermost spaced ends of the implement carrying members to angularly dispose the latter with relation to the chassis, a rock shaft mounted upon the chassis, a yoke member swingably supported upon the rock shaft and slidably accommodating the linkage connections, and an operating lever carried upon the chassis having operative connection with the rock shaft grippingly engaging the yoke member and linkage connections to impart simultaneous rocking motion to the implement carrying members.

In testimony whereof I affix my signature.

BENJAMIN V. BENSCH.